United States Patent [19]

Rogge et al.

[11] Patent Number: 5,127,746

[45] Date of Patent: Jul. 7, 1992

[54] BEARING HOLDER FOR BEARINGS MOUNTED ON JOURNALS

[75] Inventors: Dieter Rogge, Lengerich; Robert Blom, Tecklenburg, both of Fed. Rep. of Germany

[73] Assignee: Windmoller & Holscher, Lengerich, Fed. Rep. of Germany

[21] Appl. No.: 643,995

[22] Filed: Jan. 22, 1991

[30] Foreign Application Priority Data

Jan. 22, 1990 [DE] Fed. Rep. of Germany ....... 4001736

[51] Int. Cl.$^5$ .............................................. F16C 35/02
[52] U.S. Cl. ...................................... 384/436; 384/24; 384/434
[58] Field of Search ................. 384/428, 434, 435–437, 384/24; 242/68.4

[56] References Cited

U.S. PATENT DOCUMENTS

| | | | |
|---|---|---|---|
| 1,379,818 | 5/1921 | Hinnekens | 384/436 |
| 2,513,643 | 7/1950 | Griner . | |
| 3,994,543 | 11/1976 | Melugin | 384/435 |
| 4,076,337 | 2/1978 | Childress | 384/24 |
| 4,412,753 | 11/1983 | Linn | 384/434 X |
| 4,433,878 | 2/1984 | Rosenthal | 384/434 X |
| 4,791,867 | 12/1988 | Deregibus | 384/24 X |

FOREIGN PATENT DOCUMENTS 1254112 11/1967 Fed. Rep. of Germany .
724292 4/1932 France .

Primary Examiner—Thomas R. Hannon
Attorney, Agent, or Firm—Fleit, Jacobson, Cohn, Price, Holman & Stern

[57] ABSTRACT

A bearing holder for bearings mounted on journals includes a lower support socket secured to a frame, and a cover part pivotally connected with the socket. The cover part is able to be locked in a shut position, folded onto the bearing positioned in the support socket. In order to provide a bearing holder of this type, which makes possible the removal and insertion of the journals without releasing the cover parts by hand, and without having to be pivoted and locked for the purpose of opening and shutting, cover parts are pivotally beardinged on two upper lateral parts of the support socket about axes which are parallel to the journal. Such cover parts include an upper, longer arm and a lower, shorter arm of a two-armed lever. The lower arm forms an actuating part, which, in the folded back, opened position of the cover part, extends into the interior of the support socket, so that by lowering the bearing, which abuts against the same and is placed on the journals, into the support socket, the bearing pivots the cover parts into its shut position, in which the latter has its inner, arcuate sides in snug engagement with the bearing. Thus, the cover parts which, in this manner, are folded into their shut setting, and have their end faces abutting against each other, are provided with an automatic device locking the cover parts together.

4 Claims, 4 Drawing Sheets

BEARING HOLDER FOR BEARINGS MOUNTED ON JOURNALS

BACKGROUND OF THE INVENTION

1. Field of the Invention

This invention relates to a bearing holder for bearings mounted on journals, and, preferably, for bearings of printing image carrying cylinders and inking rollers of printing presses. The bearing holder includes a lower support socket, secured to a frame, and a cover part pivotally connected with the socket. The cover part is able to be locked in its shut position, folded onto the bearing positioned in the support socket.

2. Description of Related Art

A bearing holder of this type is described, for instance, in German patent publication 2,363,955 C, and is provided with a cover part which, in its shut position, generally forms the upper half of the bearing holder. The cover part is able to be locked to the lower support socket by holding screws, which are pivotally connected with the same. The holding screws are able to be pivoted into receiving and abutment parts, which are provided laterally on the lower support socket, and are able to be clamped onto the parts by nuts. To change the shaft, the printing image carrying cylinder or the engraved roller, first, the nuts of the holding screws have to be slackened off. Then, the screws have to be pivoted out of the way, in order to be able to swing the cover part clear, as a whole, for opening the bearing holder. The undoing and folding back of the cover part, therefore, has to be performed by hand. This involves considerable labor and renders the replacement of the shafts or rollers by robots or other automated equipment impossible.

SUMMARY OF THE INVENTION

One object of the invention is, therefore, to provide a bearing holder of the type initially mentioned such that the journals may be lifted out of position and put in place without it being necessary to undo the cover parts by hand or to pivot and lock the parts for the purpose of opening and shutting. A further aim of the invention is to provide a way of using automatic means for inserting journals with bearings mounted thereon in their bearing holders, and to remove them again without manual operations being necessary for opening and shutting the bearing holders.

In accordance with the invention, this object is attained, in the case of a bearing holder of the type initially mentioned, by providing respective cover parts which are pivotally bearinged on the two upper lateral parts of the support socket about axes which are parallel to the journals. The cover parts have upper, longer arms of two-armed, i.e., intermediately pivoted levers, and lower arms, which form actuating parts, which, in the folded back, opened position of each cover part, extend into the interior of the support socket. By lowering a bearing, which abuts against the lower arms and is placed on the journal, into the support socket, the bearing pivots the cover parts into their shut positions, in which the cover parts have their inner arcuate sides in snug engagement with the bearing. The cover parts, which, in this manner, are folded into their shut setting and have their end faces abutting against each other, are provided with an automatic device for locking the same together. The bearing holder, in accordance with the invention, therefore, includes two rocking cantilever cover parts, positioned symmetrically with respect to a center plane which extends vertically through the axis of the journal of the support socket. On lowering of the bearing being placed on the journal into the support socket, the cover parts close like tongs, since the bearing moves the cover parts, via their actuating parts, into the closed position.

The device for automatically locking the two cover parts together includes a hammer head-like bolt, bearinged in one cover part which is provided with a turning means and clamping drive means which fits behind a bifurcate abutment part of the other cover part. The rotary and clamping drive means may be formed by a conventional pneumatic rotary piston and cylinder unit which clamps on the shank of the hammer head-like bolt while, simultaneously, turning through 90°. Such a rotary piston and cylinder unit preferably has cams on the piston or on the piston rod, which fit into helical guides and, therefore, turn the piston rod as it is moved inwards and outwards. The arrangement may be such that in its open setting, the hammer head-like bolt fits into the bifurcate abutment part and, on operation of the rotary piston and cylinder unit, fits behind the latter while, simultaneously turning through 90° and performing a clamping action.

The opened receiving setting of the cover parts may be held by abutments provided on the latter or on the lower support socket.

BRIEF DESCRIPTION OF THE DRAWINGS

One working embodiment of the invention will now be described in more detail, with reference being made to the drawing figures.

DESCRIPTION OF THE PREFERRED EMBODIMENT

Figure 1:
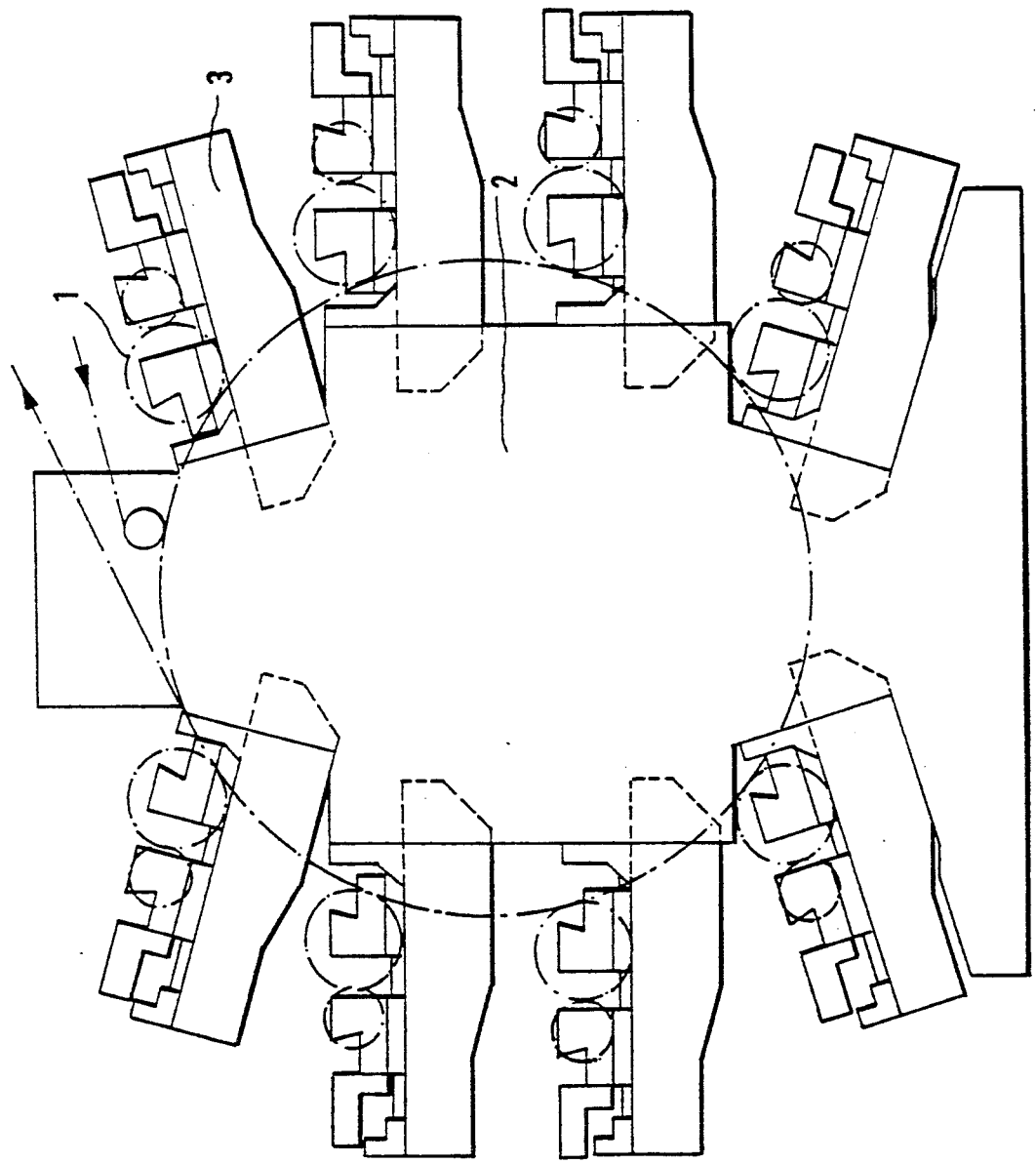
FIG. 1 is a diagrammatic side elevation view of a flexographic printing press according to the present invention.
Figure 2:
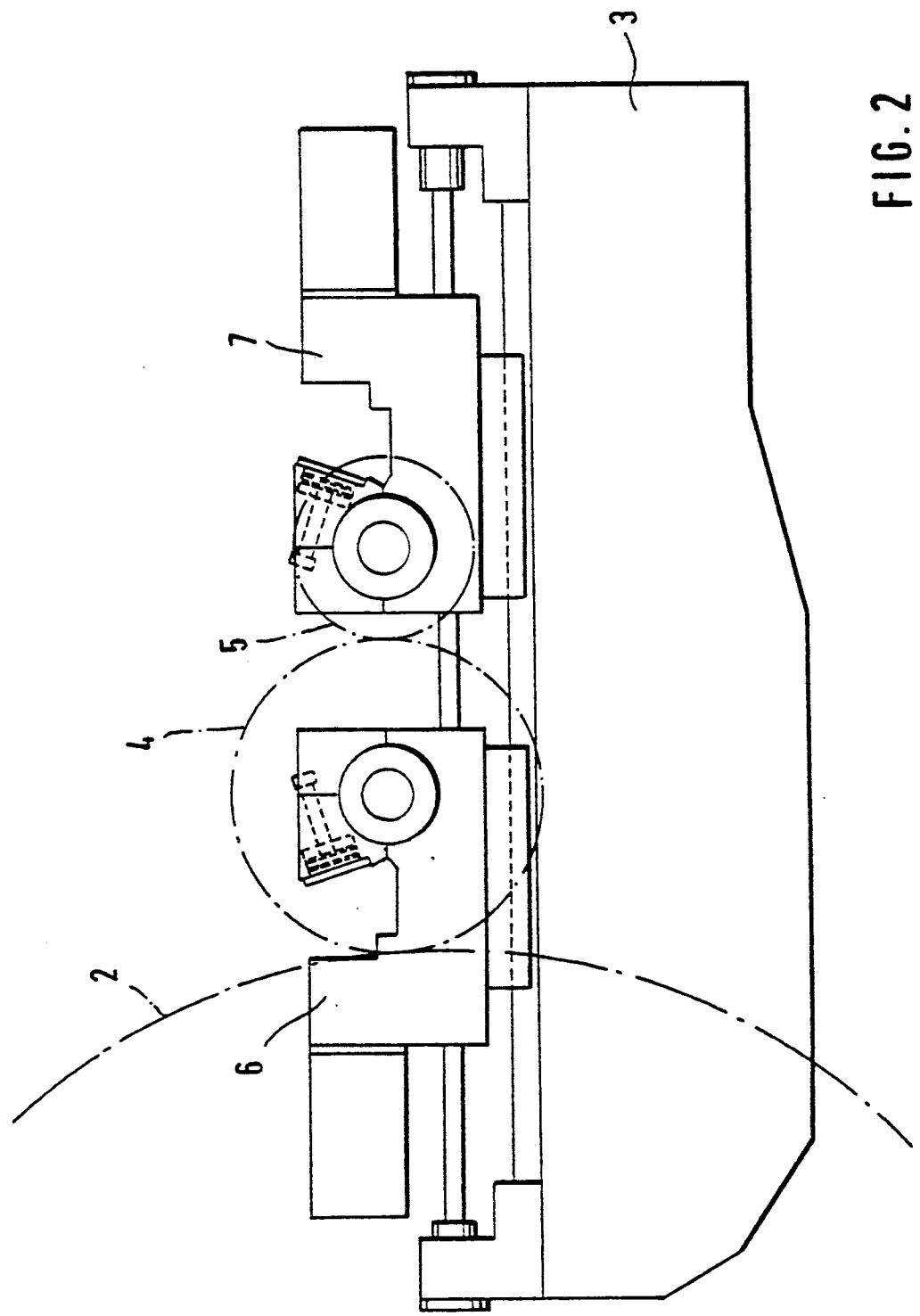
FIG. 2 is a side elevation view of a printing unit of the flexographic printing press shown in FIG. 1.

The illustrated flexographic printing press, generally illustrated in FIG. 1, is provided with a central impression cylinder 2, with which printing image carrying cylinders 4 are brought into engagement. Such cylinders 4 are mounted on printing unit stages 3, each of which is connected with a frame (not indicated), together with engraved rollers 5 on sliding bearing mounts. Flexographic printing presses of this type are described, for instance, in German patent publication 2,941,521 C. One of these printing unit stages 3 is illustrated in FIG. 2 on a larger scale. It will be seen from FIG. 2 that each printing unit stage 3 bears one printing image carrying cylinder 4 and one engraved roller 5. In order to perform adjustment of the printing image carrying cylinder 4 and of the engraved roller 5 on the inking unit stage 3, both the printing image carrying cylinder 4 and the engraved roller 5 are borne on bearing supports 6 and 7, slidingly carried on the printing unit stages 3. As FIG. 2 illustrates, each set of bearing supports 6 and 7 is carried on a common track provided on a printing unit stage.

Figure 3:
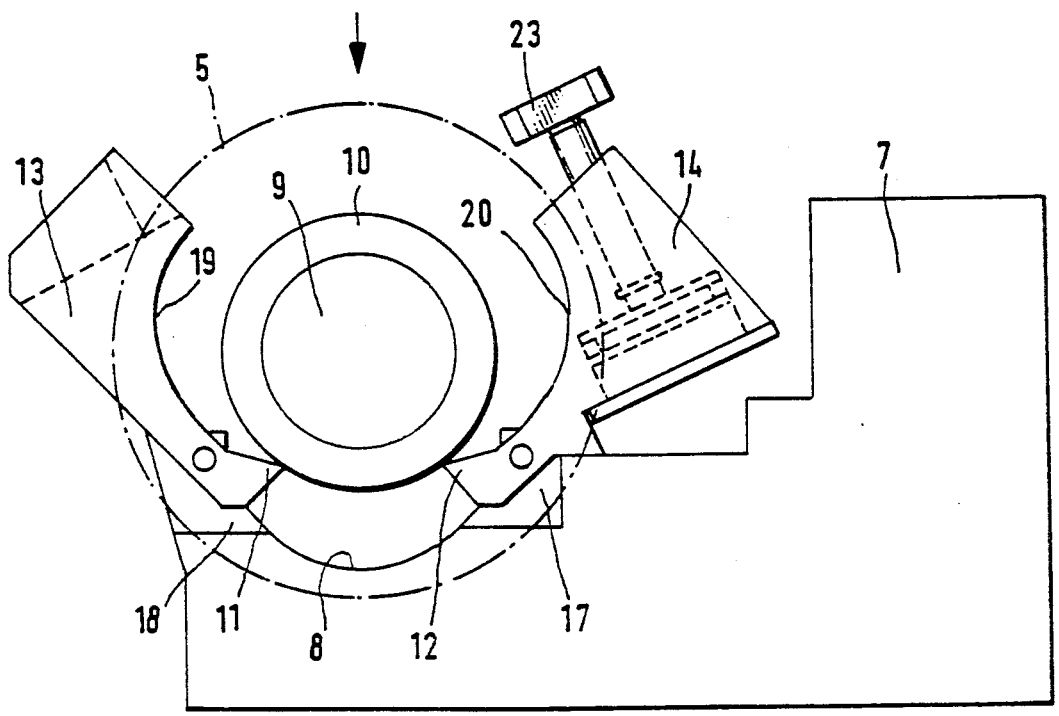
FIG. 3 is a side elevation view of a bearing holder of an engraved roller used in the printing press in an opened position.
Figure 4:
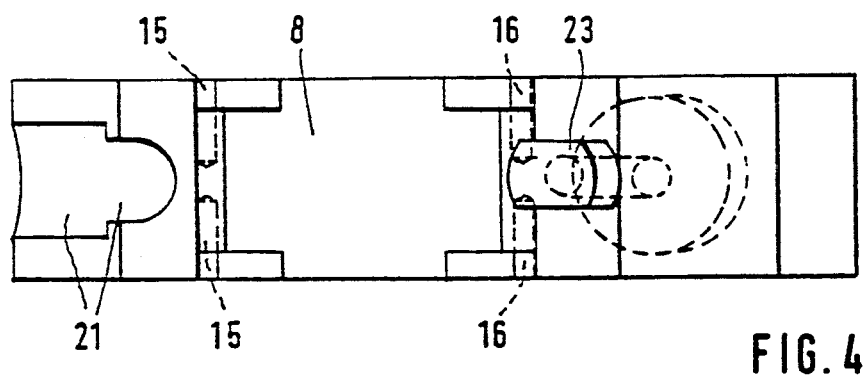
FIG. 4 is a top view of the bearing holder shown in with FIG. 3.
Figure 6:
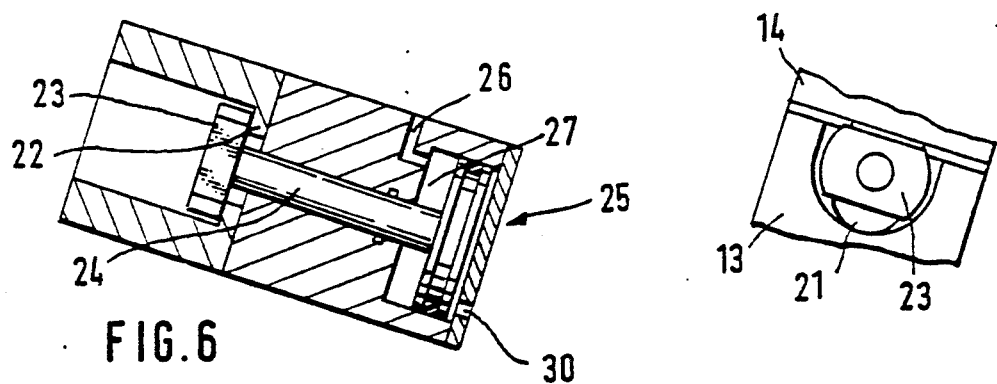
FIG. 6 is a sectional view of the bearing holder as seen along section line VI—VI of FIG. 5.
Figure 7:
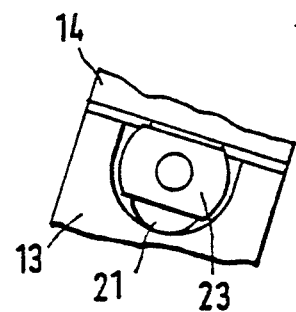
FIG. 7 is a top view of a lock means for pivoting cover parts of the bearing holder as seen in the direction indicated by arrow A in FIG. 5.

FIG. 3 shows only the engraved roller bearing support 7, which has a bearing receiving socket 9 formed therein. The bearing 10 is placed downwards into the bearing receiving socket 9, and socket 9 is mounted over the trunnion (not indicated) of the engraved roller 5. In the position illustrated in FIG. 3, the engraved roller 5 is still above the bearing receiving socket 8, machined in the engraved roller bearing support 7. In this case, the bearing 10 is just in contact with two knobs or pointed flanges 11 and 12. The knob or flange 11 is made integral with the left hand half 13 of a folding cover, and the knob or flange 12 is made integral with the corresponding right hand half 14 of the folding cover. The folding cover, therefore, is formed by left and right hand folding cover halves 13 and 14. The two folding cover halves 13 and 14 are mounted on roller bearing support 7 by pivotal bearings formed by rotary pins 15 and 16, respectively, which are provided in milled recesses 17 and 18 in the engraved roller bearing support 7. If, now, the engraved roller 5 is lowered further, the bearing 10 will take up an assembled position in the milled bearing receiving socket 8. Knobs 11 and 12 will be pressed out of the way by a camming action provided by the bearing 10 to the knobs 11 and 12 so that the two folding bearing cover halves 13 and 14 are moved towards each other. The cover halves 13 and 14 are spaced so that their engagement surfaces 19 and 20 make sealing contact above the machined bearing receiving socket 8 and above the bearing 10. In this position, the two folding cover halves 13 and 14 are locked to each other. For this purpose, as is most clearly apparent from FIGS. 4-6, the left hand folding cover half has a two part, deep machined groove 21, producing a shoulder 22 between a part of the groove 21 with the larger diameter and a part of the groove 21 with the smaller width or diameter. A clamping plate 23 fits around behind this shoulder 22 and is secured to a piston rod 24. Piston rod 24 is part of a rotary piston and cylinder unit generally indicated by reference number 25, having a cylinder which is machined into the right hand folding bearing half 14. The rotary piston and cylinder unit is able to extend piston rod 24 and, simultaneously, to turn the piston rod, due to cooperation between the cams on the piston or piston rod and the helical guides. In the case of the present working embodiment, the clamping plate 23, accordingly, moves, during folding up of the two folding cover halves 13 and 14, into the part of the lower machined groove 21 with a larger diameter. The piston rod 24 is turned by the cylinder, as described above, through 9°. Clamping plate 23, which has flats on both sides, assumes the position shown in FIG. 7. As soon as this happens, compressed air is passed, via a hole 26, into the cylinder space 27 of the rotary piston and cylinder unit, so that the piston rod 24 is retracted, and the clamping plate 23 is in firm engagement with the shoulder 22. The two folding cover halves are, therefore, firmly locked with each other.

Figure 5:
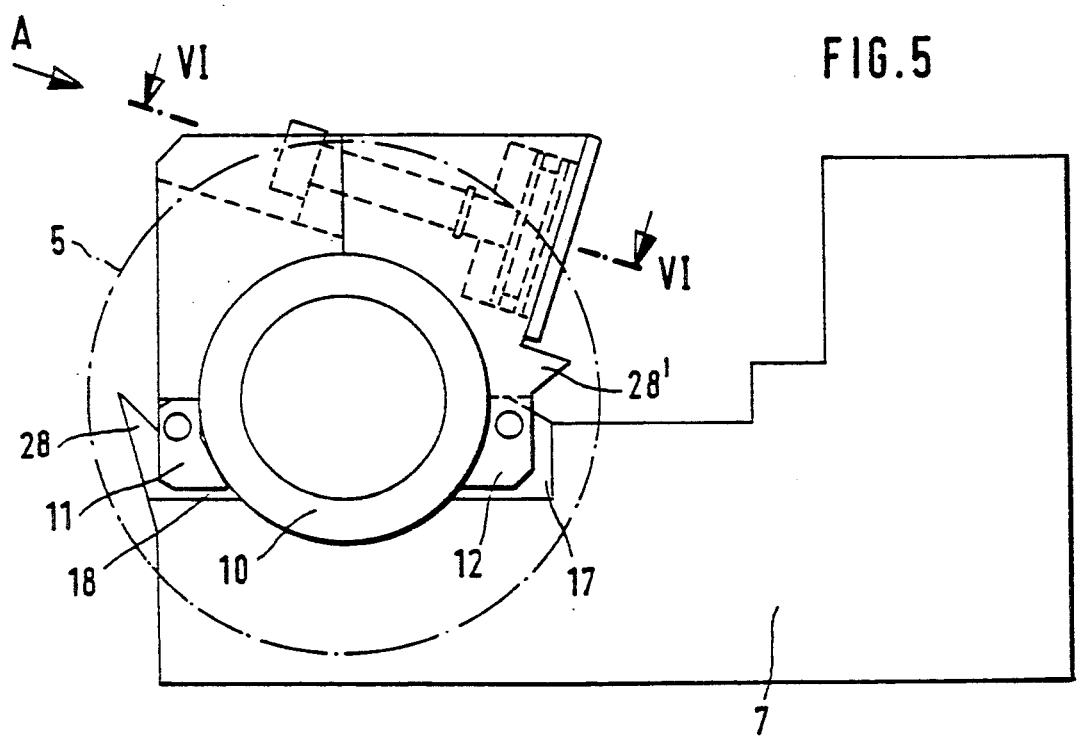
FIG. 5 is a view, similar to FIG. 3, showing the bearing holder in a shut position.

The engraved roller bearing support 7 has an abutment 28, indicated in FIG. 5, which limits the folding motion of the left hand folding cover half 13. The other, right hand folding cover half 14 similarly includes an abutment knob 28' provided thereon, as shown in FIG. 5, on which engraved roller bearing support 7 rests, so that the pivoting movement of this cover half 14 is also limited.

Although the bearing holder has been described with reference to a bearing design intended for engraved rollers, it will, nevertheless, be seen from FIG. 2 that in a similar manner, such an arrangement may clearly be used for a printing image carrying cylinder bearing support.

The manner in which the bearing may be locked after a engraved roller has been inserted has been described. If, at this point, the engraved roller 5 is to be removed again, the first step is to connect the hole 26 in the rotary piston and cylinder unit 25 with the atmosphere. Then, by means of a further hole 30, compressed air may be supplied. Accordingly, the piston rod 24 is moved outwards, and the clamping plate 23 is again turned through 90°, in the manner described above, and cover half 14 is pivoted, so that the clamping plate 23 assumes the position of rotation illustrated in FIG. 4. Then, the engraved roller 5 may be lifted out, by means of a ancillary equipment. The two folding cover halves 13 and 14 may be swung far enough outwards by the bearing 10 so that the abutment 28 on roller bearing support contacts cover half 13 and the knob 28' of the cover half 14 contacts the engraved roller bearing support 7. The device described above can, obviously, be provided on both sides of either an engraved roller or a printing image carrying cylinder in an identical manner.

We claim:

1. A holder for a bearing of a printing image carrying cylinder and an inking roller of a printing press, comprising:

a lower support socket, said bearing adapted to be lowered into said lower support socket, a pair of two armed levers, each forming one of first and second cover parts pivotally connected with the lower support socket, said cover parts being able to be locked in a shut position, wherein they are folded onto said bearing when it is positioned in the lower support socket, said first and second cover parts being supported on two upper lateral parts of the lower support socket for pivotal movement about axes which are parallel to at least one bearing journal, each of said cover parts formed by an upper longer arm of one of said two armed levers, a lower arm of each of said two armed levers forming an actuating part which extends into an interior of the lower support socket when the first and second cover parts are in folded back, opened positions so that by lowering the bearing into the lower support socket so that it abuts against the lower arm of each of said two armed levers and is placed into the support socket, the cover parts are pivoted into shut positions, in which inner arcuate sides of the cover parts are in snug engagement with the bearing, and an automatic locking drive for locking the cover parts together once the cover parts are pivoted into said shut positions so that end faces thereof abut against each other.

2. A holder as claimed in claim 1, wherein said automatic locking drive further comprises a bolt having a head which is supported by at least one bearing in one of said cover parts, said head being provided with a rotary and clamping drive and fitting behind a bifurcate abutment part of the other of said cover parts.

3. A holder as claimed in claim 2, characterized in that the rotary and clamping drive includes a pneumatic rotary piston and cylinder unit.

4. The holder as claimed in claim 1, characterized in that the cover parts are secured in said folded back, opened positions by abutments provided on the cover parts or on the lower support socket.

* * * * *